United States Patent
Smedman (10) Patent No.: US 9,277,491 B2
(45) Date of Patent: Mar. 1, 2016

(54) ACCESS POINT, A SERVER AND A SYSTEM FOR DISTRIBUTING AN UNLIMITED NUMBER OF VIRTUAL IEEE 802.11 WIRELESS NETWORKS THROUGH A HETEROGENEOUS INFRASTRUCTURE

(75) Inventor: Bjorn Smedman, Lund (SE)

(73) Assignee: Anyfi Networks AB, Malmö (SE)

( * ) Notice: Subject to any disclaimer, the term of this patent is extended or adjusted under 35 U.S.C. 154(b) by 0 days.

(21) Appl. No.: 13/328,397

(22) Filed: Dec. 16, 2011

(65) Prior Publication Data

US 2012/0209934 A1 Aug. 16, 2012

Related U.S. Application Data (63) Continuation of application No. PCT/EP2010/055958, filed on May 3, 2010.

(30) Foreign Application Priority Data

Jun. 18, 2009 (SE) .................................. 0900827

(51) Int. Cl.
*G06F 15/173* (2006.01)
*H04B 7/00* (2006.01)
(Continued)

(52) U.S. Cl.
CPC ........... *H04W 48/18* (2013.01); *H04L 12/5692* (2013.01); *H04L 12/5695* (2013.01);
(Continued)

(58) Field of Classification Search
CPC ..... H04W 48/12; H04W 48/18; H04W 48/20; H04W 72/02; H04W 72/04; H04L 12/5691; H04L 12/5692; H04L 12/5695
USPC ......... 455/41.2; 709/233, 223–224, 226–228; 370/338; 470/338
See application file for complete search history.

(56) References Cited

U.S. PATENT DOCUMENTS

| 6,023,622 A * | 2/2000 | Plaschke et al. ............ 455/452.2 |
| 6,434,392 B1 * | 8/2002 | Posti .......................... 455/452.1 |

(Continued)

FOREIGN PATENT DOCUMENTS

| EP | 1 777 978 A1 | 4/2007 |
| WO | 02/058336 A2 | 7/2002 |
| WO | 02/058336 A2 | 7/2002 |

OTHER PUBLICATIONS

International Search Report, corresponding to PCT/EP2010/055958, mailed on Jul. 7, 2010.

(Continued)

*Primary Examiner* — Viet Vu
*Assistant Examiner* — Michael A Chambers
(74) *Attorney, Agent, or Firm* — Alissa L. Saenz (57) ABSTRACT

There is provided methods, devices and computer program products for distributing a plurality of virtual IEEE 802.11 wireless networks through a heterogeneous infrastructure. A terminal sends a service provider request to an access point. The service provider request is forwarded to a master server which searches for available service providers. Acknowledgement information relating to available service providers capable of operatively connecting the terminal to the data communications network via the access point is sent by the master server to the access point. The access point forwards this information to the terminal. The access point may thus distribute a plurality of virtual IEEE 802.11 wireless networks, their number only constrained by the number of distinct identifiable service providers and the memory of the master server. A data connection may be established in the absence of a direct service agreement between the service provider of the terminal and the operator of the access point.

12 Claims, 5 Drawing Sheets

(51) Int. Cl.
*H04W 4/00* (2009.01)
*H04W 48/18* (2009.01)
*H04W 48/20* (2009.01)
*H04W 72/04* (2009.01)
*H04L 12/54* (2013.01)
*H04W 72/02* (2009.01)
*H04W 48/12* (2009.01)

(52) U.S. Cl.
CPC .......... *H04W48/20* (2013.01); *H04L 12/5691* (2013.01); *H04W 48/12* (2013.01); *H04W 72/02* (2013.01); *H04W 72/04* (2013.01)

(56) References Cited

U.S. PATENT DOCUMENTS

| | | | | |
|---|---|---|---|---|
| 6,522,881 | B1 * | 2/2003 | Feder et al. | 455/437 |
| 6,738,459 | B1 * | 5/2004 | Johnstone et al. | 379/114.01 |
| 7,339,915 | B2 * | 3/2008 | Jakkahalli et al. | 370/338 |
| 7,472,192 | B2 * | 12/2008 | DeFerranti et al. | 709/226 |
| 7,613,142 | B2 * | 11/2009 | Molteni et al. | 370/328 |
| 7,616,615 | B2 * | 11/2009 | Sueyoshi et al. | 370/338 |
| 7,660,253 | B2 * | 2/2010 | Monette et al. | 370/235 |
| 7,701,912 | B2 * | 4/2010 | Thompson et al. | 370/338 |
| 7,706,265 | B2 * | 4/2010 | Monette et al. | 370/230 |
| 7,706,789 | B2 * | 4/2010 | Qi et al. | 455/432.1 |
| 7,792,996 | B2 * | 9/2010 | Monette et al. | 709/246 |
| 7,881,198 | B2 * | 2/2011 | Monette et al. | 370/235 |
| 7,916,701 | B1 * | 3/2011 | Viswanath et al. | 370/338 |
| 7,940,735 | B2 * | 5/2011 | Kozisek et al. | 370/338 |
| 7,958,256 | B2 * | 6/2011 | Keeler | 709/233 |
| 8,077,619 | B2 * | 12/2011 | Monette et al. | 370/235 |
| 8,200,276 | B2 * | 6/2012 | Trinkel et al. | 455/554.2 |
| 2002/0173310 | A1 * | 11/2002 | Ebata et al. | 455/445 |
| 2003/0017828 | A1 * | 1/2003 | Kotzin et al. | 455/434 |
| 2003/0228842 | A1 * | 12/2003 | Heinonen et al. | 455/41.2 |
| 2004/0198220 | A1 * | 10/2004 | Whelan et al. | 455/41.1 |
| 2004/0214572 | A1 * | 10/2004 | Thompson et al. | 455/435.2 |
| 2006/0166668 | A1 * | 7/2006 | Choi et al. | 455/435.2 |
| 2007/0081477 | A1 * | 4/2007 | Jakkahalli et al. | 370/310 |
| 2008/0281979 | A1 * | 11/2008 | Keeler | 709/233 |
| 2009/0109941 | A1 * | 4/2009 | Carter | 370/338 |
| 2010/0118847 | A1 * | 5/2010 | Lee et al. | 370/338 |

OTHER PUBLICATIONS

Written Opinion of the International Searching Authority, corresponding to PCT/EP2010/055958, mailed on Jul. 7, 2010.

* cited by examiner

ACCESS POINT, A SERVER AND A SYSTEM FOR DISTRIBUTING AN UNLIMITED NUMBER OF VIRTUAL IEEE 802.11 WIRELESS NETWORKS THROUGH A HETEROGENEOUS INFRASTRUCTURE

TECHNICAL FIELD

The present invention relates to the general field of data communications networks. Particularly the present invention relates to methods, apparatuses and computer programs for establishing a data connection between a terminal and a data communications network.

BACKGROUND

The main technologies for mobile broadband are High Speed Packet Access (HSPA), Long Term Evolution (LTE) and Worldwide Inter-operability for Microwave Access (WiMAX). These technologies are based on the traditional cellular network architecture; base stations (which may be installed e.g. in radio towers) may cover an area of a few square kilometres (a so-called macrocell) and are usually operatively connected to base station controllers and the core network through Synchronous Digital Hierarchy (SDH) or a similar backhaul technology.

Much of the cost of such networks lay in planning the network, installing base stations and providing backhaul. Deals have to be negotiated with property owners and equipment must be purchased, installed and serviced. To improve capacity and reduce cost most mobile broadband technologies also support so-called picocells. For picocells a very small base station operatively connected to a base station controller and the core network through the customers' existing broadband Internet connection is installed in a customer home or office.

IEEE 802.11 (Institute of Electrical and Electronics Engineers) compatible technology may also be used to provide service access (e.g. to the Internet) outside of the home or office. A location with IEEE 802.11 compatible access points providing service access to the public is often referred to as a "hotspot" while a larger area, such as a neighbourhood with continuous coverage, is often referred to as a "hot zone". While the IEEE 802.11 standard supports strong authentication and encryption these features are often disabled in a public network to allow potential customers to access information about the network and its services. The most common technical solution, known as the Universal Access Method (UAM), is that the Hyper Text Transfer Protocol (HTTP) requests from an unauthenticated terminal are redirected to a captive portal where users are requested to authenticate themselves using a web browser by entering their user credentials before they are authorized to access the desired service (e.g. the Internet) through the network.

SUMMARY OF THE INVENTION

Disadvantages of the traditional cellular network architecture may include high cost per bit and low overall network capacity. Acquiring spectrum licenses, building radio towers, installing base station equipment and providing backhaul is costly. The low network capacity can be attributed to the large average distance between terminal and base station; often a kilometre or more. This may lead to low average bit rates and (in densely populated areas) a large number of terminals competing for spectrum access in the same cell.

In many urban areas where cellular networks capable of mobile broadband services are being deployed there already is a fine-knit radio access network consisting of residential Internet connections and IEEE 802.11 compatible wireless access points. Also, because of the on-demand nature of Internet communication only about 1-2% of the total capacity of this infrastructure is used at a given point in time. While network congestion is a frequent cause of reduced quality of service in fixed residential Internet connections the bottlenecks in these types of networks lay most often not in the last mile infrastructure (where the infrastructure is typically not shared between subscribers) but rather in the aggregation network for example between the Main Distribution Frame (MDF) and the operator's core network. Capacity in this part of the network can often be increased at a relatively low cost.

The inventors have identified a number of problems associated with existing technology that must be overcome before IEEE 802.11-type schemes can be used to provide mobile broadband on a large scale. For example, users may be required to find and select a network that has a roaming agreement with their service provider. For example, users may require to be authenticated by their service provider without risking theft of their credentials. For example, network traffic may be encrypted to ensure privacy and prevent modification not only in radio transmissions but also while being transferred over a wired network that cannot be physically protected. For example, the public Internet protocol (IP) addresses used to provide the service may be required to be traceable back to individual users in order to comply with legal requirements and regulations. For example, users may be billed for services used and revenue may be shared between the parties that collectively produced the services. The above considerations should be automated to a large degree, preferably without requiring modification of existing terminal hardware or software.

The present invention proposes to solve, or at least mitigate, the abovementioned problems by providing methods, apparatuses and computer programs for establishing a data connection between a terminal and a data communications network.

According to a first aspect there is provided a method for establishing a data connection between a terminal and a data communications network. There is thus provided a method for use in an access point for establishing a data connection between a terminal and a data communications network, comprising receiving, from the terminal, a service provider request comprising a MAC address of the terminal and an SSID; sending, to a master server, request information pertaining to the service provider request; receiving, from the master server, acknowledgement information relating to available service providers capable of operatively connecting the terminal to the data communications network via the access point; sending, to the terminal, a service provider request response comprising at least one SSID identifying the available service providers and related to the received acknowledgement information; receiving, from the terminal, data connection information pertaining to establishing the data connection between the terminal and the data communications network via the access point using a selected service provider from the available service providers; and establishing a data connection between the terminal and the data communications network via the access point by using the selected service provider.

One advantage may be that a terminal may automatically find an access point through which the services provided by the user's preferred service providers can be accessed. One advantage may be that an unmodified IEEE 802.11 compatible terminal may automatically find an access point which can be operatively connected to the users preferred service provider so that the user may access the services of its preferred service provider.

The service provider request may be sent in a Probe Request frame, which may be an IEEE 802.11 Probe Request frame. The service provider request response may be sent in individual Probe Response frames for each one of the available service providers, which may be IEEE 802.11 Probe Response frames. The data connection information may be sent in an Authentication frame which may be an IEEE 802.11 Authentication frame. One advantage may be that an unmodified IEEE 802.11 compatible terminal may be used.

The method may further comprise sending, to the master server, information pertaining to the selected service provider.

One advantage may be that the master server may store and use this information to deduce the users preferred service providers and answer later service provider requests with these. One advantage may be that the master server may store and later use this information to bill the appropriate service provider.

One advantage may be that the communications protocol between the terminal and the access point may comply with specifications of an existing protocol, e.g. IEEE 802.11, which has the limitation that a service provider request response can include only a single service provider.

The method may further comprise receiving, from the terminal, authentication information relating to the established data connection using the selected service provider; and sending, to a service provider server, the received authentication information, wherein the authentication information comprises at least one from a group of user credentials and a digital certificate.

One advantage may be that the user is authenticated to the service provider without risking theft of user credentials and the service provider is authenticated to the user (i.e. the user can be sure that they are communicating with their service provider even if they do not trust the network operator).

The SSID of the service provider request may be empty.

One advantage may be that the terminal then does not have to disclose its list of trusted service providers. One advantage may be that the terminal functions with existing IEEE 802.11 compatible terminals that have implemented this security improvement.

The available service providers may depend on the MAC address.

One advantage may be that the master server may use the MAC address to deduce the user's preferred service providers by looking at previous choices made from the same terminal.

The method may further comprise searching for available service providers based on the service provider request in a service provider list associated with the access point, and wherein the request information is sent to the master server only in case no available service providers are found in the service provider list.

One advantage may be that the method may be incorporated as a fall-back in a regular access point.

The method may further comprise registering identification of the terminal. The method may further comprise registering identification of the access point. The method may further comprise registering the service provider request. The method may further comprise registering the selected service provider.

One advantage may be that the master server may store and use this information to deduce the users preferred service providers and answer later service provider requests with these. One advantage may be that the master server may store and later use this information to bill the appropriate service provider and compensate the appropriate network operator.

The method may further comprise registering network traffic information of the established data connection.

One advantage may be that this information can be later used to determine the amount that the operator should be compensated with by the service provider.

According to a second aspect there is provided an access point for establishing a data connection between a terminal and a data communications network, comprising a receiver for receiving, from the terminal, a service provider request comprising a MAC address of the terminal and an SSID; a sender for sending, to a master server, request information pertaining to the service provider request; the receiver further being configured to receive, from the master server, acknowledgement information relating to available service providers capable of operatively connecting the terminal to the data communications network via the access point; the sender further being configured to send, to the terminal, a service provider request response comprising at least one SSID identifying the available service providers and related to the received acknowledgement information; the receiver further being configured to receive, from the terminal, data connection information pertaining to establishing the data connection between the terminal and the data communications network via the access point using a selected service provider from the available service providers; and a processing unit for establishing a data connection between the terminal and the data communications network via the access point by using the selected service provider.

According to a third aspect there is provided a method for use in a master server for establishing a data connection between a terminal and a data communications network, comprising receiving, from an access point, request information pertaining to a service provider request comprising a MAC address of the terminal and an SSID; searching for available service providers based on the received request information; and sending acknowledgement information comprising at least one SSID identifying available service providers capable of operatively connecting the terminal to the data communications network via the access point.

One advantage may be that a terminal may automatically find an access point through which the services provided by the user's preferred service providers can be accessed.

The available service providers may depend on service providers relating to service providers previously used by the terminal.

One advantage may be that empty service provider requests may be answered without returning a full list of service providers. One advantage may be that an unmodified IEEE 802.11 compatible terminal may be informed of a meaningful subset of service providers without consuming a disproportionate amount of spectrum to transmit the service provider responses and that this subset may be presented to the user through the user interface of the terminal. One advantage may be that the full list of service providers may be very long, its length only constrained by the memory of the master server.

The method may further comprise registering identification of the terminal. The method may further comprise registering identification of the access point. The method may further comprise registering the service provider request. The method may further comprise registering the selected service provider.

The method may further comprise receiving, from the access point, network traffic information pertaining to the network traffic between the terminal and the access point; and registering the network traffic information of the established data connection.

The method may further comprise receiving, from the access point, data connection information pertaining to a selected service provider from the available service providers; and registering the selected service provider.

According to a fourth aspect there is provided a master server for establishing a data connection between a terminal and a data communications network, comprising a receiver for receiving, from an access point, request information pertaining to a service provider request and comprising a MAC address of the terminal and an SSID; a processor unit for searching for available service providers based on the received request information; and a sender for sending acknowledgement information comprising at least one SSID identifying available service providers capable of operatively connecting the terminal to the data communications network via the access point.

According to a fifth aspect there is provided a method in a system comprising an access point, a master server and a service provider server for establishing a data connection between a terminal and a data communications network, comprising receiving, by the access point, a service provider request comprising a MAC address of the terminal and an SSID; sending, by the access point, request information pertaining to the service provider request to the master server; receiving, by the master server, the request information; searching, by the master server, for available service providers based on the received request information; sending, by the master server, acknowledgement information relating to available service providers capable of operatively connecting the terminal to the data communications network via the access point to the access point; receiving, by the access point, the acknowledgement information; sending, by the access point, a service provider request response comprising at least one SSID identifying the available service providers and related to the received acknowledgement information; receiving, by the access point, authentication information relating to the established data connection using the selected service provider; and sending, by the access point, the received authentication information to the service provider server.

According to a sixth aspect there is provided a computer program product comprising software instructions stored on a computer-readable medium, which when executed on a processor performs a method in an access point according to the above.

According to a seventh aspect there is provided a computer program product comprising software instructions stored on a computer-readable medium, which when executed on a processor performs a method in a master server according to the above.

The computer-readable medium may be a computer memory. The computer-readable medium may be an optical disc, such as a CD record or a DVD record.

The second, third, fourth, fifths, sixth and seventh aspects may generally have the same features and advantages as the first aspect.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described, by way of example, with reference to the accompanying schematic drawings, in which.

DETAILED DESCRIPTION OF PREFERRED EMBODIMENTS

Figure 1:
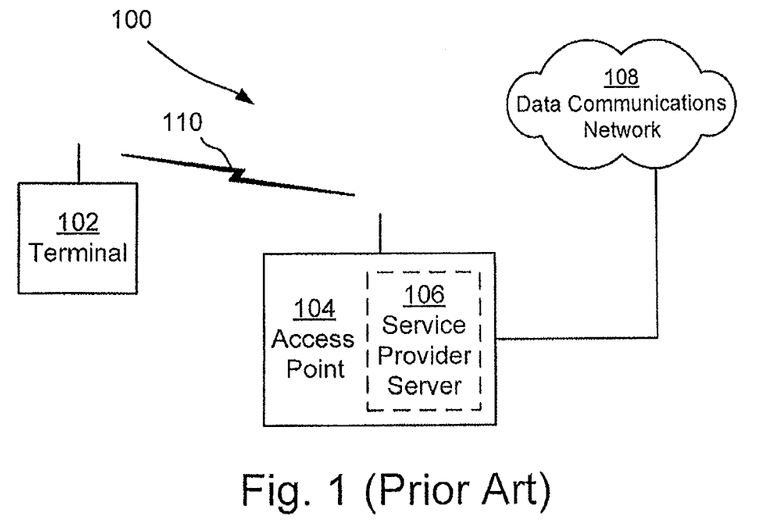
FIG. 1 is a schematic view of a prior art communications system.

In general like numbers refer to like elements throughout the disclosure. A first communications system 100 according to prior art is illustrated in FIG. 1. The prior art system 100 comprises a terminal 102, a data communications network 108 and an access point 104 associated with a service provider server 106. The terminal, which for example may be a computer, a personal digital assistant, a mobile communications device or the like, is arranged to be wirelessly operatively connected to the data communications network via the access point as illustrated by reference numeral 110. The data communications network may be a local area network, or a wide area network, and may provide access to different services such as Telephony, Television, and the Internet. The access point may be a wireless router. The service provider server is associated with the service provider of the terminal. In general the system 100 may comprise a plurality of terminals and access points.

A terminal requesting a wireless connection to the data communications network 108 sends a service provider request. If the terminal conforms to the IEEE 802.11 standard this service provider request is sent in the form of a Probe Request frame containing a service set identifier (SSID) identifying the service provider. In case an access point associated with the service provider of the terminal receives this request the access point may send a notification to the terminal that the access point and hence the associated service provider is accessible. If the access point conforms to the IEEE 802.11 standard this notification is sent in the form of a Probe Response frame. Thereafter a data connection may be established between the terminal and the data communications network via the access point. Likewise, in case no access point associated with the service provider of the terminal receives the service provider request it may not be possible to establish a data connection between the terminal and the data communications network.

Figure 2:
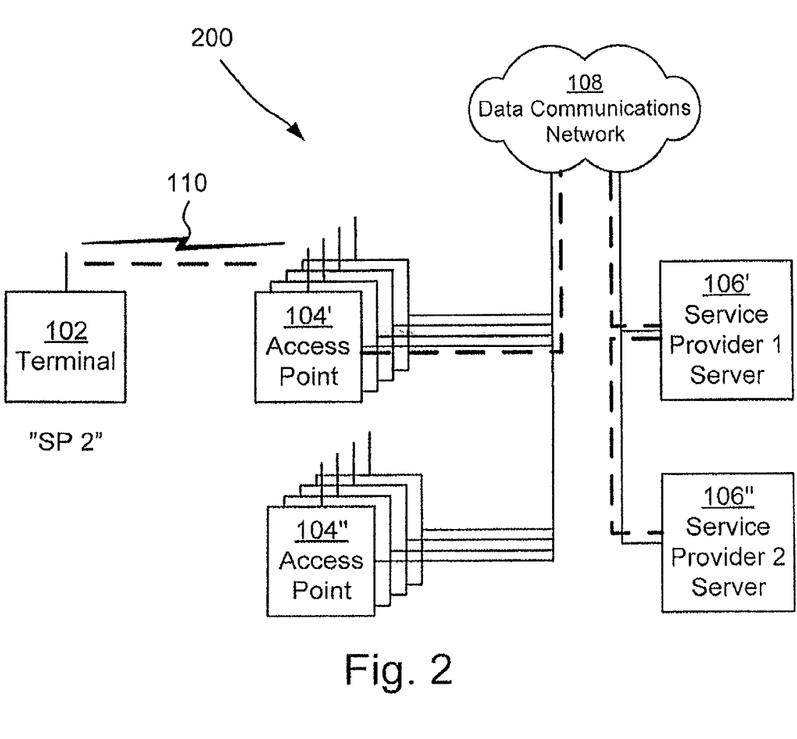
FIG. 2 is a schematic view of a communications system according to embodiments.

A second communications system 200 is illustrated in FIG. 2. The communications system 200 comprises a terminal 102, a first plurality of access points, one of which is denoted by reference numeral 104', a second plurality of access points, one of which is denoted by reference numeral 104", a server

106' for a first service provider, a server 106" for a second service provider and a data communications network 108. The first plurality of access points 104' is associated with the first service provider and the second plurality of access points 104" is associated with the second service provider.

A terminal 102 requesting a wireless connection to the data communications network 108 starts with sending a service provider request. In case an access point associated with the service provider of the terminal receives this request the data connection may be established as described above with reference to the system 100 of FIG. 1.

For large networks the operator may have agreements with several service providers under which the customers of these service providers may use the network. In case an access point which is not associated with the service provider of the terminal receives this request the data connection may be established as described by way of the following example. Assume that, as indicated by the notation "SP 2" in FIG. 2, the terminal 102 is associated with the second service provider and thus associated with service provider server 106". The service provider request is received by access point 104' which is assumed to be associated with the first service provider via service provider server 106'. The service provider request is sent from the access point 104' to the service provider associated with the access point, i.e. to service provider server 106'. In the absence of a service agreement between the first service provider and the second service provider the establishment of the connection between the terminal and the data communications network is terminated. In case of existence of such a service agreement the first service provider server 106 forwards the service provider request to the second service provider service 106". Thereafter a data connection may be established between the terminal 102 and the data communications network 108 via the access point 104' and the first service provider server 106'.

An extra step may thus be introduced in the captive portal; before the user enters their credentials they are asked to select their service provider from a list. The user credentials are then forwarded to the selected service provider using an Authentication, Authorization and Accounting (AAA) protocol such as RADIUS. The selected service provider authenticates the user and authorizes the user for access to the data communications network.

Hence, a service agreement is required between the different service providers. Otherwise a terminal associated with the second service provider may not establish a connection to the data communications network via an access point associated with the first service provider. Furthermore, all data traffic is sent via the service provider server associated with the access point, independently of which service provider the terminal is associated with. The necessary data communication paths for the authentication are indicated by the dashed lines in FIG. 2. This may affect security aspects of the connection between the terminal and the data communications network as well as the connection between the terminal and the associated service provider.

Furthermore, in IEEE 802.11 compatible networks the only information regarding services available to the terminal before connecting to the network is the SSID, a short string periodically broadcasted in Beacon frames and included in Probe Response frames. Because each operator assigns their own SSID to their network it may be difficult for a user in an unfamiliar location to find a network that has a roaming agreement with the users preferred service provider. The user may manually instruct the terminal to connect to each available network in turn and check the captive portal for instructions on how to sign-in with existing credentials by using e.g. a web browser. If the network operator does not have a roaming agreement with the user's preferred service provider the user can either establish a service agreement (such as a billing relationship) with a new (unknown) service provider or search for another open network. When a suitable network has been found one problem may be that the terminal may be required to trust the new (unknown) service provider in order to use the network and sign-in using existing credentials.

Modern IEEE 802.11 access points support a virtual access point feature. That is, one physical access point can appear to terminals as several separate access points, each with its own network name, or so-called Service Set Identifier (SSID). This feature is sometimes used by operators to let one or a few service providers more clearly indicate or advertise the availability of their services through their own SSID. Traffic received by the access point from terminals associated with this SSID is usually emitted on a separate Ethernet Virtual Local Area Network (VLAN) so that a separate captive portal interface can be used for this virtual network. The number of such virtual access points may however be limited to a small number, usually less than 10. The reason for this is twofold. Firstly, since a separate beacon is periodically transmitted for each virtual access point a larger number of such access points could cause beacons to consume a disproportionate amount of available spectrum. Secondly, since memory and other resources required for the operation of the Media Access Control (MAC) layer of each virtual access point are allocated statically when the access point starts operating the maximum number of virtual access points is constrained by the limited resources of the access point device. This makes it impractical for an operator of a public network to allocate a separate virtual network to each service provider.

Also, IEEE 802.11 compatible terminals assume that (virtual) access points with the same SSID belong to the same Extended Service Set (ESS), i.e. that they provide Layer 2 connectivity to the same network. This enables automatic hand-over between access points while maintaining higher layer connections, e.g. TCP/IP connections. The communications systems 100, 200 described above cannot ensure Layer 2 connectivity when the terminal is handed over from an access point belonging to one network operator to an access point belonging to another network operator. The result may be that higher layer connections are interrupted and an IP address collision may occur. This makes it impractical for network operators with overlapping coverage to distribute the same virtual network.

The proposed network architecture improves the communication systems described above. Firstly, the proposed network architecture dynamically allocates a separate virtual access point for each requested service provider on demand. This enables a network operator to distribute the services of a very large number of service providers. Secondly, the proposed network architecture ensures that Layer 2 connectivity is maintained even as the terminal roams between access points associated with separate network operators. This enables a service provider to distribute its services through the access points of a very large number of network operators, possibly with overlapping network coverage. Lastly, the proposed network architecture enables a third party to operate a master server and act as the clearing partner for roaming between service providers and network operators. This ensures that service providers and network operators only need a roaming agreement with the third party, thereby reducing the number of necessary legal agreements to a manageable level.

Combined, these improvements make it feasible to, among other applications, use low cost IEEE 802.11 based access points connected to residential Internet connections to provide mobile broadband on a large scale.

Figure 3:
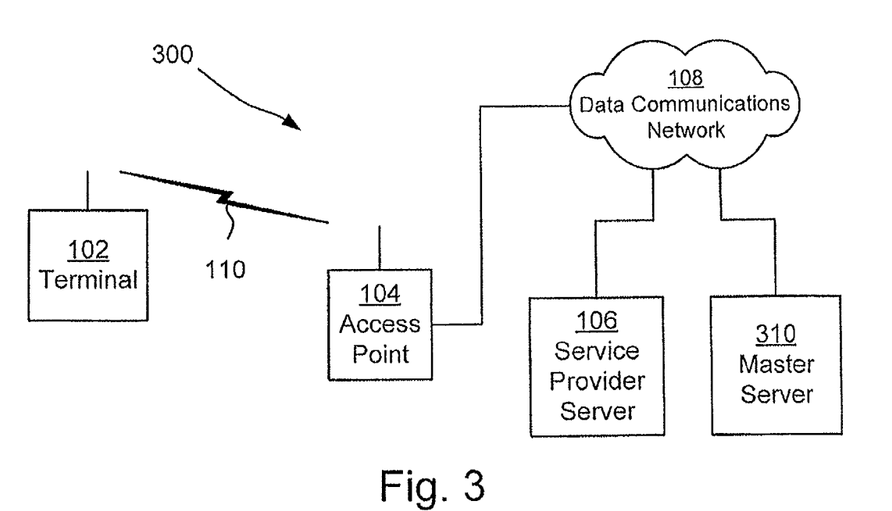
FIG. 3 is a schematic view of a communications system according to embodiments.

A third communications system 300 is illustrated in FIG. 3. The communications system 300 comprises a terminal 102, an access point 104, a service provider server 106, a data communications network 108 and a so-called master server 310. As stated above the terminal 102 may be a computer, a personal digital assistant, a mobile communications device or the like. The terminal may conform to the IEEE 802.11 standard. The present invention does not require an IEEE 802.11 compatible terminal to be modified. The access point 104 is configured to be operatively connected to both the service provider server 106 and the master server 310 via the data communications network 108.

Figure 5A:
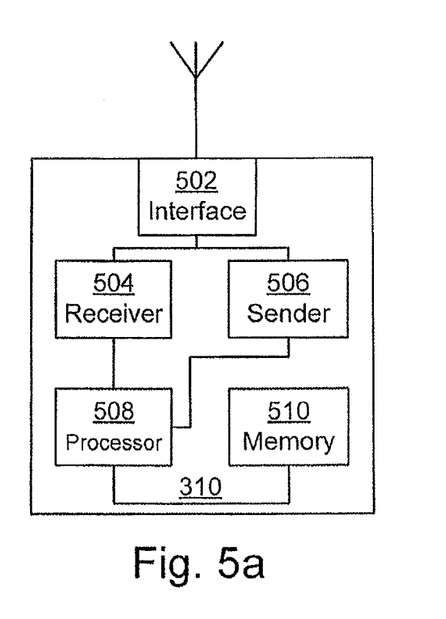
FIG. 5a is a schematic view of a master server according to embodiments.

FIG. 5a is a schematic illustration of internal components of a so-called master server 310 according to embodiments. In general terms the master server 310 is configured to perform operations associated with the process of operatively connecting a terminal to a data communications system, wherein the operations may comprise receiving request information pertaining to a service provider request, searching for available service providers based on the received request information, and sending acknowledgement information relating to available service providers. The master server 310 may also be configured to store information related thereto. The master server 310 comprises a communications interface 502. The communications interface 502 may be an antenna and/or a network socket, or the like, enabling the master server 310 to communicate with other entities in a communications system. The communications interface 502 is arranged to be in communication with a receiver 504 arranged to receive data messages and signals and with a sender 506 arranged to send data messages and signals. The receiver 504 and the sender 506 are arranged to be in communication with a processing unit 508. The processing unit 508 may be a Central Processing Unit (CPU). The processing unit 508 is further arranged to be in communication with a memory 510.

In a preferred embodiment the master server is implemented using several computer servers in a redundant high availability configuration. The communications interface is implemented as a network socket bound to an IP address reachable from a wide area network, such as the Internet.

Figure 5B:
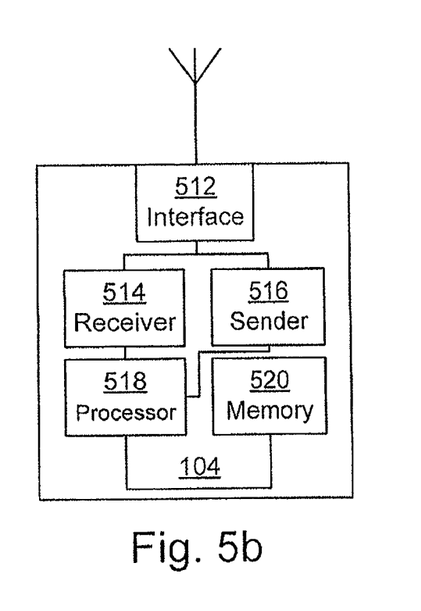
FIG. 5b is a schematic view of an access point according to embodiments.

FIG. 5b is a schematic illustration of internal components of an access point 104 according to embodiments. The access point 104 comprises a communications interface 512. The communications interface 512 may be an antenna and/or a network socket, or the like, enabling the access point 104 to communicate with other entities in a communications system. The communications interface 512 is arranged to be in communication with a receiver 514 arranged to receive data messages and signals and with a sender 516 arranged to send data messages and signals. The receiver 514 and the sender 516 are arranged to be in communication with a processing unit 518. The processing unit 518 may be a Central Processing Unit (CPU). The processing unit 518 is further arranged to be in communication with a memory 520.

In a preferred embodiment the access point is implemented using a low cost embedded system with two communications interfaces. The first communications interface used primarily for communication with the terminal comprises an IEEE 802.11 compatible radio with a software defined media access control (MAC) layer. Software control over the MAC layer makes it possible to realise the disclosed methods and devices using standard low cost IEEE 802.11 hardware. The second communications interface is used primarily for communication with the master server and comprises a network socket bound to an IP address from which the master server can be reached. An IP based second communications interface makes it possible to deploy an access point in any location with Internet access.

Figure 6A:
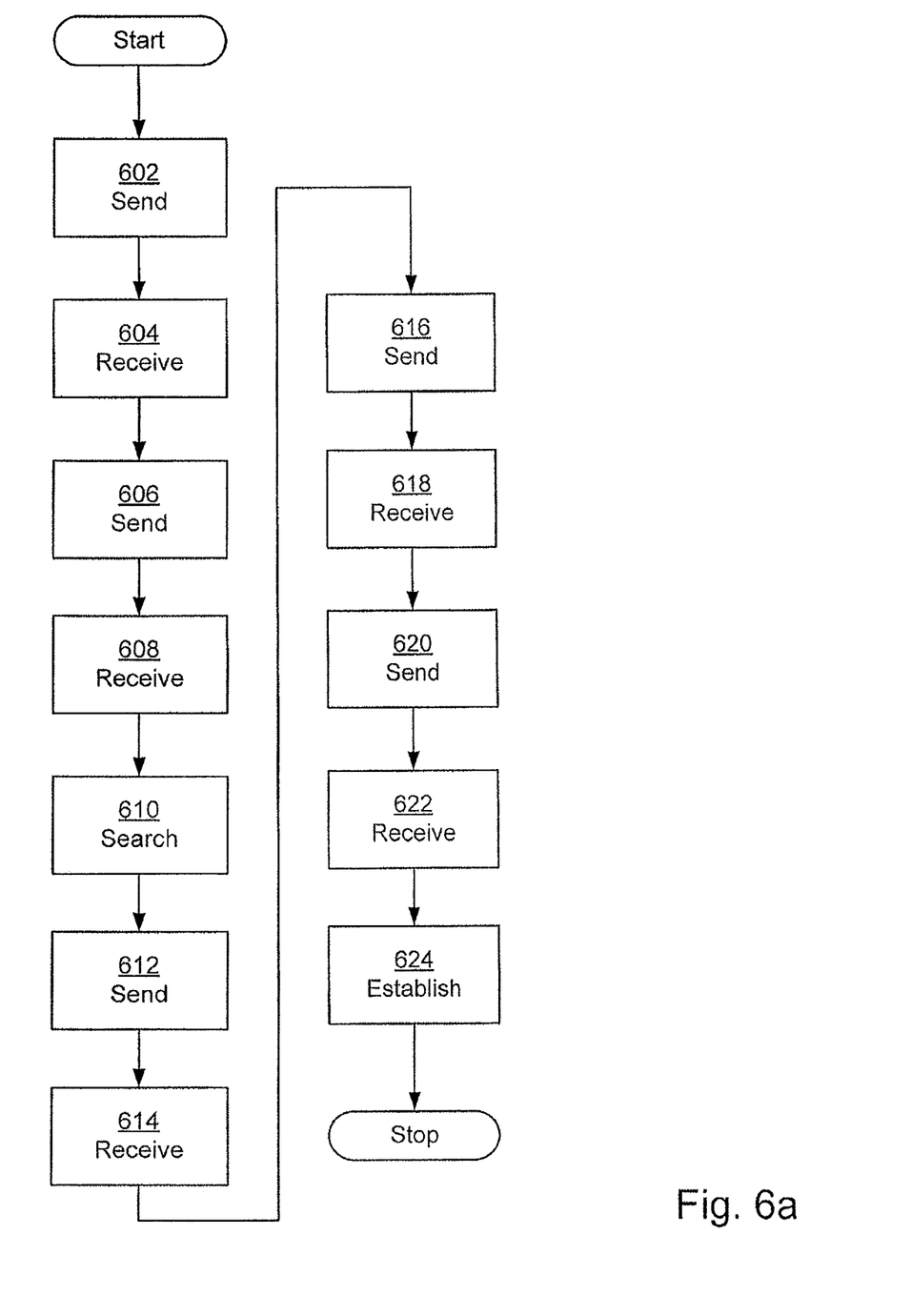
FIGS. 6(a)-6(c) are flowcharts according to embodiments.

A method in a system, such as the system 300, for establishing a data connection between a terminal 102 and a data communications network 108 will now be described with reference to the flowchart of FIG. 6a. A terminal 102 requesting a data connection to the data communications network 108 sends a service provider request step 602. In a preferred embodiment the terminal is an unmodified IEEE 802.11 standard conformant device and the service provider request is a Probe Request frame containing a service set identifier (SSID) identifying the preferred service provider. The terminal may identify one or more preferred service providers in the service provider request. Alternatively, individual service provider requests may be sent for each preferred service provider. The preferred service providers may be service providers which have served as service providers for the terminal in the past. The preferred service providers may also be service providers with which the terminal has a subscription service agreement and thereby already established a number of connection policies, or the like. In a preferred embodiment the service provider request also contains the MAC address of the terminal.

Alternatively the service provider request may be a so-called empty service provider request. For the empty service provider request the terminal does not specify a preferred service provider. An empty service provider request may be sent in case the terminal does not receive a response from a preferred service provider. Alternatively an empty service provider request may be sent from the terminal in case an anonymous service provider request is preferred in order to not disclose the preferred service provider and thereby avoid access points indicating fraudulent behaviour (e.g. by stating to be an access point for a service provider not associated with the access point). In a preferred embodiment an empty service provider request is implemented as a Probe Request frame containing a zero length SSID.

The service provider request is received by the receiver 514 of the access point 104, step 604. According to embodiments the access point may have access to a service provider list comprising information regarding previously preferred service providers. This information may be stored as a list of data items in the memory 520 of the access point. Alternatively this information may be stored remotely, such as in the memory 510 of the master server 310. The access point may utilize the processing unit 518, to search for available service providers based on the service provider request in the service provider list. Identification of the terminal, identification of the access point and the service provider request may be registered in the memory 520. This information may be associated with the service provider list.

In a preferred embodiment the access point conforms to the IEEE 802.11 specification. A set of virtual access points may be statically allocated in the access point. The service provider list comprising information regarding previously preferred service providers for each terminal may however be stored in the memory of the master server 310. No access point resources are statically allocated for the entries in the list of service providers.

In case the access point is associated with the service provider requested by the terminal the access point may forward the service provider request to the requested service provider using the sender 516 and the interface 512 of the access point 104. In case the service provider requested by the terminal is included in the service provider list, the access point may forward the service provider request to the requested service provider either directly or via the master server. The available service providers may also depend on the MAC address of the terminal.

The access point may also send the request information pertaining to the service provider request to the so-called master server e.g. for purposes of generating behavioural statistics of the terminal. In addition, in case the service provider requested by the terminal is not found in the service provider list, or in case an empty service provider request is sent, the access point sends the request information pertaining to the service provider request to the master server, step 606. The request information may be sent to the so-called master server only in case no available service providers are found in the service provider list.

In a preferred embodiment a software component is added to the access point. The software component detects ingress IEEE 802.11 management frames on the first communications interface. When the software component detects an ingress Probe Request frame with a zero length SSID, or an SSID for which there is no statically allocated virtual access point, the frame is translated to a network message and sent to the master server through the second communications interface.

The master server may then receive the request information, step 608 by the receiver 504 associated with the interface 502. Available service providers based on the received request information may then be searched, step 610, by using the processing unit 508. In case one or more available service providers is found this information may be sent to the terminal via the access point using the sender 506. The available service providers may e.g. depend on service providers relating to service providers previously used by the terminal. As for the access point, the master server may a have access to a list of available service providers, in which list previously used service providers may be indicated. Alternatively, if no available service providers are found the master server may indicate this in a message sent to the terminal. Such a situation may e.g. occur when there is a network failure. In other words, the master server may send acknowledgement information relating to available service providers capable of operatively connecting the terminal to the data communications network via the access point to the access point, step 612.

In a preferred embodiment the master server receives the service provider request network message and searches the service provider list in one of two ways. If the message indicates that the Probe Request frame contains a non-zero SSID the service provider list is searched for a service provider with a matching SSID. If the message indicates that the Probe Request frame contains a zero length SSID the service provider list is instead searched for a set of service providers that the terminal, identified by the MAC address, has previously selected as a preferred service provider.

The acknowledgement information is then received by the access point, step 614. The access point then sends a service provider request response related to the received acknowledgement information, step 616. In case more than one service provider is available individual service provider request responses for each available service provider may be sent.

In a preferred embodiment the service provider request response messages are generated indirectly according to a method as disclosed below. First a virtual access point is dynamically allocated for each of the service providers in the response. The dynamically allocated virtual access points are then asked to process the original Probe Request frame, thereby generating Probe Response frames identical to those that would have been generated had the virtual access points been statically allocated, but with a delay. In practice most unmodified IEEE 802.11 compatible terminals can gracefully cope with a delay of up to 1000 ms, thereby rendering the method completely transparent to the end user.

Most regular IEEE 802.11 compatible access points can be configured to operate in one of two operational modes. In the first of these the access point broadcasts the SSID of the network in each Beacon frame and answers Probe Request frames containing a zero-length SSID with a Probe Response frame containing the SSID of the network. In the second operational mode the access point instead broadcasts a zero-length SSID in Beacon frames and does not reply to Probe Request frames containing a zero-length SSID. An access point operating in this mode is often referred to as a "hidden" access point as it cannot easily be detected by a terminal which does not know the SSID of the network.

A third operational mode, henceforth referred to as a semi-hidden access point, is here disclosed. In this mode of operation the access point broadcasts a zero-length SSID in Beacon frames and answers Probe Request frames containing a zero-length SSID with a Probe Response frame containing the SSID of the network if and only if the source MAC address of the Probe Request frame belongs to a specific terminal. The access point thereby behaves as a hidden access point to all but the selected terminal.

According to an embodiment the software controlled MAC layer of the dynamically allocated virtual access point is modified to implement the semi-hidden mode of operation and configured to reply to Probe Request frames containing a zero-length SSID only from the specific terminal for which it was allocated. One advantage may be that many terminals may use the network in the same place, e.g. a sports stadium or an airport, without Probe Response frames consuming a disproportionate amount of spectrum resources or causing the terminals network selection user interface to display the service providers preferred by other nearby terminals.

In this context it should be noted that, as the terminal 102 may be a mobile terminal, the disclosed communications systems may be configured to handle handover and roaming issues. For example, the terminal may be moveable from a current coverage cell associated with a current access point to a next coverage cell associated with a next access point without forcing the data connection between the terminal and the data communications network to be terminated. The current embodiments concern the establishment of a new connection, a process which may last in the range of a few seconds. Also, in case the access points are located such that an overlapping cell structure is created it is unlikely that the data connection between the terminal and the access point will be terminated during the actual establishment process.

The service provider request responses are received by the terminal, step 618. The terminal (with or without the assistance of a user) may choose to establish a connection to the data communications network via the access point using a selected service provider from the available service providers. Thus the terminal may send data connection information pertaining to establishing the data connection between the terminal and the data communications network via the access point using a selected service provider from the available service providers to the access point, step 620. This information is then received by the access point, step 622, and a data connection between the terminal and the data communications network via the access point may be established by using the selected service provider, step 624. Thereby the terminal is operatively connected to the data communications network.

In a preferred embodiment the terminal is an unmodified IEEE 802.11 standard conformant device and the terminal selects a service provider by sending an Authentication frame followed by an Association Request frame containing the MAC address of the virtual access point associated with the preferred service provider. The access point then establishes a Layer 2 Tunnelling Protocol (L2TP) connection to the service provider server using the second communications interface, thereby operatively connecting the terminal to the data communications network of the preferred service provider. This ensures that Layer 2 connectivity is maintained as the terminal roams, even between networks operated by different network operators. Also, since the users preferred service provider acts as the gateway for the terminal towards the Internet the public IP address of the terminal is traceable back to the service provider and the individual user. This may be necessary in order to comply with legal requirements and regulations.

The method disclosed above may ensure Layer 2 connectivity while roaming over a large area, e.g. an entire city or even the entire world. While unicast traffic can easily be switched to the appropriate access point broadcast traffic would normally be sent to all access points operatively connected to the service provider server, and would there be transmitted as an IEEE 802.11 data frame. In a large network with many access points broadcast traffic would therefore consume a disproportionate amount of spectrum. By assigning each terminal to a separate VLAN two objectives are achieved. Firstly, direct terminal to terminal communication is blocked, thereby improving security. Secondly, broadcast traffic is directed only to the access point through which the terminal is connected, thereby ensuring scalability.

Furthermore, the terminal may send authentication information relating to the established data connection using the selected service provider to the access point over an encrypted data connection. Thus the access point may not have access to the data packet (i.e. to the embedded authentication information) but only to the addressee. This improves security aspects of the network. The authentication information may further comprise at least one from a group of user credentials and a digital certificate. The received authentication information is then sent by the access point to a service provider server of the service provider over an encrypted data connection. Likewise, acknowledgment information pertaining to the authentication may be sent from the service provider server to the terminal.

According to an embodiment the implementation of the media access control (MAC) layer is split between the access point and the service provider server. The access point implements the real-time aspects of the MAC layer, e.g. the transmission of acknowledgement (Ack) frames, whereas the service provider server implements non-real-time aspects such as encryption key management. Control messages and data frames encrypted according to the IEEE 802.11i standard are transferred over the public Internet using a UDP/IP based protocol such as CAPWAP without possibility of interception or modification. This end-to-end encryption between terminal and service provider server ensures that no trust relationship between the end user and the access point operator is necessary: not even with physical control over the access point is it possible to intercept or modify data frames. The end user only needs to trust his or her service provider, which is a commonly established trust relationship.

The access point may send information pertaining to the selected service provider to the master server. The selected service provider may be registered either in the access point or in the master server. The selected service provider may be stored in association with the service provider list. Such information may be usable for purposes of generating behavioural statistics of the terminal. Similarly, network traffic information of the established data connection may also be registered.

In a preferred embodiment the access point and service provider server periodically report radio link quality, traffic volume and similar statistics to the master server. These statistics are processed by the master server to determine the amount to be paid by the service provider to the operator of the access point as compensation for enabling the service.

Figure 4:
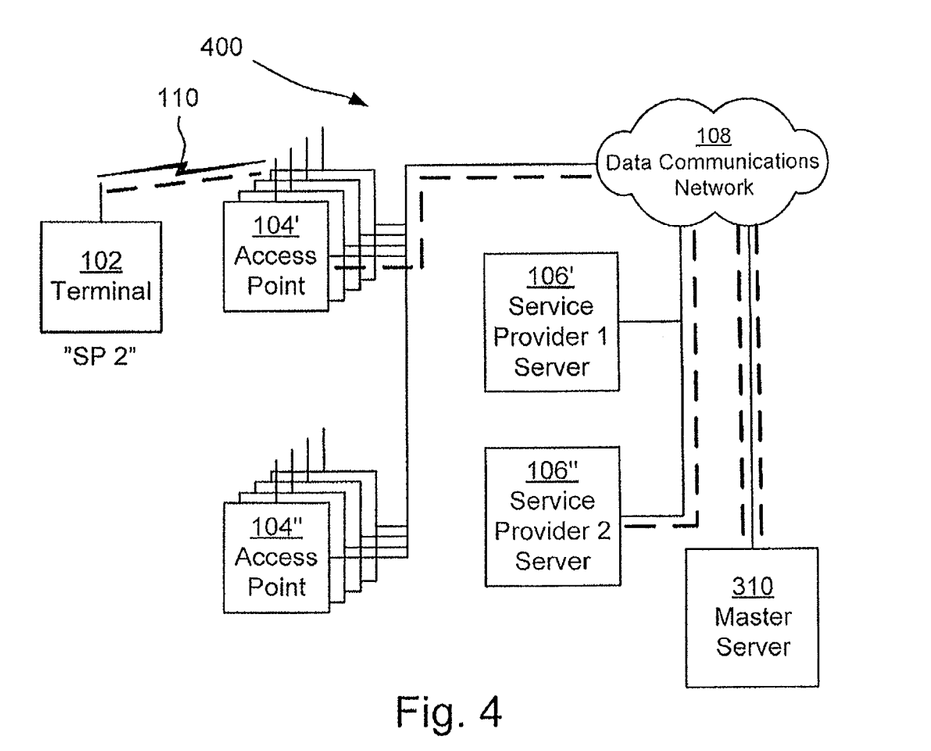
FIG. 4 is a schematic view of a communications system according to embodiments.

A fourth communications system 400 is illustrated in FIG. 4. Similarly to the communications system 300 the communications system 400 comprises a terminal 102, a data communications network 108, and a master server 310. In contrast to the system 300 the system 400 further comprises a first plurality of access points, one of which is denoted by reference numeral 104', a second plurality of access points, one of which is denoted by reference numeral 104", a server 106' for a first service provider, and a server 106" for a second service provider. The first plurality of access points and the second plurality of access points are operatively connected to the master server 310.

The communications system 400 enables a direct comparison to the communications system 200 discussed above. According to the communications system 200 a service provider request not associated with the service provider of the receiving access point is forwarded first to the service provider server of the receiving access point and then from the service provider server of the receiving access point to the service provider server of the requested service provider. This forwarding procedure is avoided by the communications system 400. Therefore the network security and integrity may be improved. Furthermore, the existence of a service provider agreement between different service providers may not be required. As indicated in FIG. 4 the system 400 may comprise a plurality of service providers and a plurality of access points operated by a plurality of network operators. The services of each service provider may be accessed through a plurality of access points.

However, as implicitly disclosed with reference to the description of system 300, a service provider request not associated with the service provider of the receiving access point does not need to be sent to the service provider server of the receiving access point. Instead, as disclosed above, in case a requested service provider is not found in the service provider list of the access point, the service provider request is forwarded to the master server. The master server may then perform a lookup of the requested service provider and forward the request to this service provider server. Thus, the master server may serve as an independent and secure party. As a consequence any encrypted data traffic, such as authentication information, passwords, etc., does not need to be sent via a service provider server not associated with the terminal.

For example, assume that the terminal 102 of FIG. 4 requests access to the data communications network 108 via a service provider associated with service provider server 106", as denoted by "SP 2". The service provider request is received by access point 104' associated with service provider server 106'. Access point 104' does not find the requested service provider in the service provider list and hence forwards the request to the master server 310. The master server 310 performs a lookup and finds service provider server 106" associated with the requested service provider. The master server 310 then forwards the request to service provider server 106". Thereafter the data traffic pertaining to the data connection from the terminal 102 and the data communications network 108 may be directed directly from the access point 104' to the service provider server 106" (i.e. without being directed via the service provider server 106' associated with the access point 104'). In FIG. 4 the associated data traffic paths are outlined by the dashed lines.

One advantage may be that unmodified terminal software may automatically find a network through which the user can access the services of their service provider. One advantage may be that unmodified terminal software may automatically authenticate the user to the network. One advantage may be that the user is not exposed to any risk of having their credentials stolen in the authentication process. One advantage may be that unmodified terminal software may automatically establish an end-to-end encrypted connection between the terminal and the service provider server. One advantage may be that unmodified terminal software can automatically authenticate the network to the user, i.e. the user can be sure that their service provider is the encrypted communication end-point. One advantage may be that the user only has to trust their own service provider. No trust relationship between user and operator or user and master server provider may be necessary. One advantage may be that because of the strong authentication and the encrypted end-to-end connection the service provider may have a reliable record of IP-address usage. One advantage may be that unmodified terminal software may automatically perform hand-over between access points, even when those access points are operated by different network operators.

Combined, the above advantages makes it feasible to use IEEE 802.11-type schemes to provide mobile broadband on a large scale in densely populated areas.

Figure 5C:
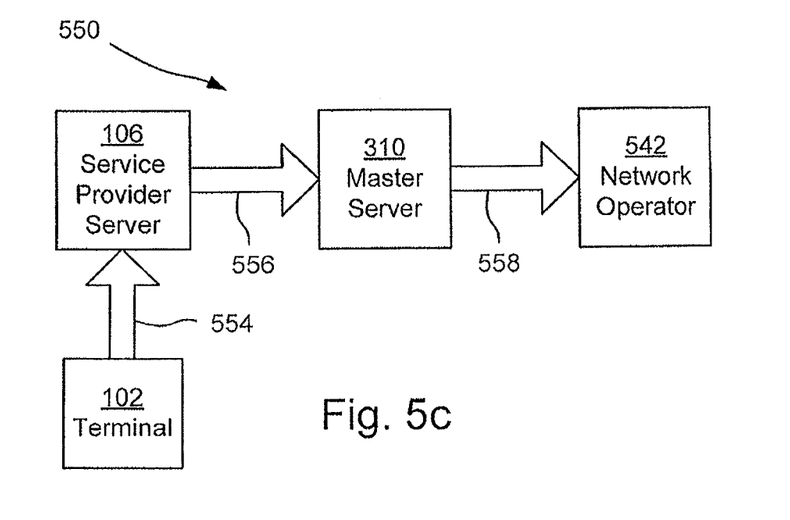
FIG. 5c is a schematic view of a flow process according to embodiments.

FIG. 5c schematically illustrates an account information flow process in a system 550 according to embodiments. The system 550 may correspond to the systems 300 or 400, but for clarifying reasons the data communications network 108 has been omitted. In addition to a terminal 102, a service provider server 106 and a master server 310 the system 500 further comprises a network operator 552. The arrows 554, 556, 558 indicate account information flows. In general terms, a network operator may also be known as carrier service provider, wireless service provider, wireless carrier, mobile phone operator, or cellular company. The network operator may be a company. The network operator may provide network infrastructure to be used by service providers in order for the service providers to be able to provide services for terminals. Thus, the network operator may provide the physical access points. One company may act both as a service provider and a network operator. In this case the embodiments allow access points associated with a first service provider to be utilized by a second, different, service provider, although the terminal has an exclusive service agreement with only one service provider, as indicated by the arrow 554. Thus account information may flow between the terminal 102 and the service provider server 106. The master server may have access to terminal account information pertaining to the associations between access points, service providers, and network operators. Thus account information may flow between the service provider server 106 and the master server 310, as indicated by the arrow 556, and also between the master server 310 and the network operator 552, as indicated by the arrow 558. The account information may relate to a business agreement between the user and the service provider, a business agreement between the service provider and the master server, a business agreement between the master server and the network operator, and/or a business agreement between the service provider and the network operator.

Figure 6B:
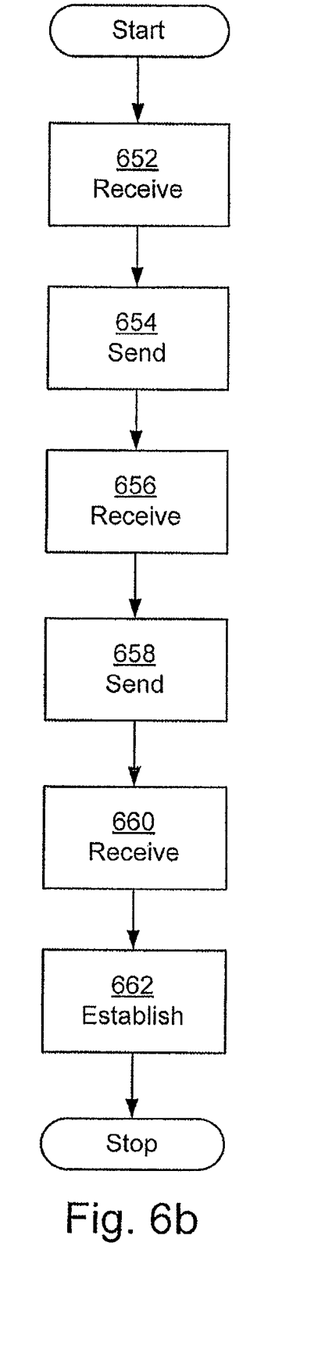
Figure 6C:
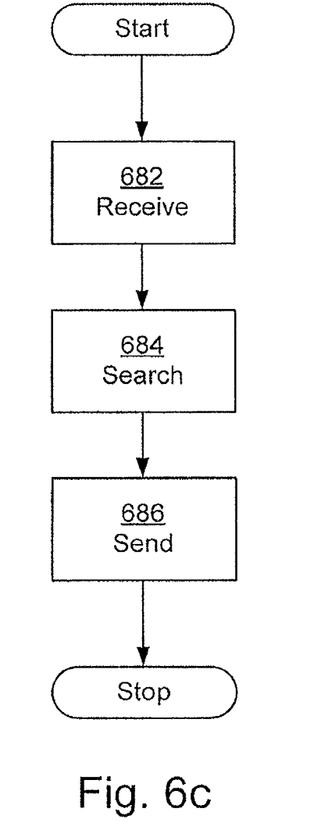

At least parts of the disclosed method may be performed in an access point as disclosed above. Steps of the method as performed by the access point have been described above and will now be disclosed with reference to FIG. 6b which is a flowchart according to embodiments of a method in an access point for establishing a data connection between a terminal and a data communications network. In the access point a service provider request is received from a terminal, step 652. Request information pertaining to the service provider request is sent by the access point to a master server, step 654. Acknowledgement information relating to available service providers capable of operatively connecting the terminal to the data communications network via the access point is then received from the master server, step 656. A service provider request response related to the received acknowledgement information is then sent to the terminal, step 658. Data connection information pertaining to establishing the data connection between the terminal and the data communications network via the access point using a selected service provider from the available service providers is received from the terminal, step 660. A data connection between the terminal and the data communications network via the access point by using the selected service provider is then established, step 662. According to embodiments step 658 and/or step 660 may be optional.

At least parts of the disclosed method may be performed in a master server as disclosed above. Steps of the method as performed by the master server have been described above and will now be disclosed with reference to FIG. 6b which is a flowchart according to embodiments of a method in a master server for establishing a data connection between a terminal and a data communications network. In the master server request information pertaining to a service provider request is received from an access point, step 682. The master server searches for available service providers based on the received request information, step 684. Acknowledgement information relating to available service providers capable of operatively connecting the terminal to the data communications network via the access point is then sent to the access point, step 686.

It will be appreciated that a person skilled in the art can modify the above-described embodiments in many ways and still use the advantages of the invention as shown in the embodiments above. Thus, the invention should not be limited to the shown embodiments but should only be defined by the appended claims.

The invention claimed is:

1. A method for use in an access point for establishing a data connection between a terminal and a data communications network, comprising
   receiving, from the terminal, a service provider request comprising a media access control (MAC) address of the terminal and a service set identifier (SSID);
   sending, to a master server, request information pertaining to the service provider request;
   receiving, from the master server, acknowledgement information relating to available service providers capable of operatively connecting the terminal to the data communications network via the access point;
   allocating at least one virtual access point associated with the access point;
   Sending, to the terminal, a service provider request response comprising at least one SSID identifying the available service providers and related to the received acknowledgement information;
   receiving, from the terminal, data connection information pertaining to establishing the data connection between the terminal and the data communications network via the access point using a selected service provider from the available service providers; and establishing a data connection between the terminal and the data communications network via the access point by using the selected service provider;

wherein said at least one virtual access point is a semi-hidden access point.

2. The method according to claim 1, wherein said service provider request is sent in a Probe Request frame, wherein said service provider request response is sent in individual Probe Response frames for each one of said available service providers, and wherein said data connection information is sent in an Authentication frame.

3. The method according to claim 2, wherein said Probe Request frame is an Electrical and Electronics Engineers IEEE 802.11 Probe Request frame, wherein said Probe Response frame is an IEEE 802.11 Probe Response frame, and wherein said Authentication frame is an IEEE 802.11 Authentication frame.

4. The method according to claim 1, wherein the SSID of the service provider request is empty.

5. The method according to claim 1, further comprising Sending, to the master server, information pertaining to the selected service provider.

6. The method according to claim 1, further comprising Receiving, from the terminal, authentication information relating to the established data connection using the selected service provider; and—Sending, to a service provider server, the received authentication information, wherein the authentication information comprises at least one from a group of user credentials and a digital certificate.

7. The method according to claim 1 wherein the available service providers depend on the MAC address.

8. The method according to claim 1, further comprising Searching for available service providers based on the service provider request in a service provider list associated with the access point, and wherein The request information is sent to the master server only in case no available service providers are found in the service provider list.

9. The method according to claim 1, further comprising Registering any from a group of identification of the terminal, identification of the access point and the service provider request.

10. The method according to claim 1, further comprising Registering the selected service provider.

11. The method according to claim 1, further comprising— Registering network traffic information of the established data connection.

12. The method according to claim 1, wherein the method is capable of establishing a data connection to at least one of the at least one data communications network of an unlimited number of data communications networks.

* * * * *